United States Patent
Hurtta

(10) Patent No.: US 7,506,362 B2
(45) Date of Patent: Mar. 17, 2009

(54) METHOD AND SYSTEM FOR BEARER AUTHORIZATION IN A WIRELESS COMMUNICATION NETWORK

(75) Inventor: Tuija Hurtta, Espoo (FI)

(73) Assignee: Nokia Siemens Networks Oy, Espoo (FI)

(*) Notice: Subject to any disclaimer, the term of this patent is extended or adjusted under 35 U.S.C. 154(b) by 387 days.

(21) Appl. No.: 10/344,104

(22) PCT Filed: Jun. 27, 2001

(86) PCT No.: PCT/EP01/07345

§ 371 (c)(1),
(2), (4) Date: Sep. 29, 2003

(87) PCT Pub. No.: WO03/003690

PCT Pub. Date: Jan. 9, 2003

(65) Prior Publication Data

US 2004/0073686 A1    Apr. 15, 2004

(51) Int. Cl.
G06F 21/20    (2006.01)
G06F 15/16    (2006.01)

(52) U.S. Cl. .............................. 726/4; 726/12
(58) Field of Classification Search ............ None
See application file for complete search history.

(56) References Cited

U.S. PATENT DOCUMENTS

| | | | |
|---|---|---|---|
| 5,796,727 A | | 8/1998 | Harrison et al. |
| 5,815,664 A | * | 9/1998 | Asano ............... 709/227 |
| 6,608,832 B2 | * | 8/2003 | Forslow ............. 370/353 |
| 6,816,912 B1 | * | 11/2004 | Borella et al. ........ 709/238 |
| 6,973,086 B2 | * | 12/2005 | Patil et al. ........... 370/392 |
| 6,973,506 B2 | * | 12/2005 | Ishiyama et al. ...... 709/245 |

(Continued)

FOREIGN PATENT DOCUMENTS

EP    0 622 924 A2    2/1994

(Continued)

OTHER PUBLICATIONS

3G TS 23.207 V1.5.0. 3rd Generation Partnership Project: End-to-End QoS Concept and Architecture. May 2001.*

*Primary Examiner*—Christopher A Revak
(74) *Attorney, Agent, or Firm*—Squire, Sanders & Dempsey, LLP

(57) ABSTRACT

The present invention is a method and a system for bearer authorization in a wireless communication network, including the creation of an authorization binding information (AUTN) in a control function (PCF) of an application layer of the wireless communication network, the allocation of a control function identifier representative of the actual address of the control function in the wireless communication network and incorporating said identifier into the authorization binding information, the transmission of the so created authorization binding information to a terminal device (UE) having access to the wireless communication network, and the bearer authorization proceeding from the terminal device through a transport layer of the wireless communication layer by deriving the actual address of the control function from which the authorization binding function has originated based on the control function identifier included in the authorization binding information. In this manner, inherent security risks involved in sending the actual control function address to a terminal device or User Equipment are eliminated, and the authorization binding information is reduced in size.

43 Claims, 1 Drawing Sheet

U.S. PATENT DOCUMENTS

| | | |
|---|---|---|
| 7,079,499 B1 * | 7/2006 | Akhtar et al. ............... 370/310 |
| 2002/0120749 A1 * | 8/2002 | Widegren et al. ........... 709/227 |
| 2002/0138622 A1 * | 9/2002 | Dorenbosch et al. ........ 709/227 |
| 2002/0184510 A1 * | 12/2002 | Shieh ........................ 713/185 |
| 2005/0013280 A1 * | 1/2005 | Buddhikot et al. .......... 370/349 |
| 2006/0291422 A1 * | 12/2006 | Rochford .................... 370/331 |

FOREIGN PATENT DOCUMENTS

| | | | |
|---|---|---|---|
| WO | WO 0117310 A1 | | 3/2001 |
| WO | WO 03/003690 | * | 1/2003 |

* cited by examiner

METHOD AND SYSTEM FOR BEARER AUTHORIZATION IN A WIRELESS COMMUNICATION NETWORK

BACKGROUND OF THE INVENTION

1. Field of the Invention

The present invention relates to a method and system for providing improved security for bearer authorization in a wireless communication network such as a Universal Mobile Telecommunications System (UMTS) network.

2. Description of the Prior Art

Data services of the Global System for Mobile communications (GSM) have launched a new era of mobile communications. The early analog cellular modems had become unattractive to the market as they were slow and unreliable. Now the market for data is moving onwards (more bursty) and upwards (more traffic), and the standardization institutes are working towards higher data rates but more significantly also towards packet data services. This will certainly broaden the appeal to end users because data is routed more efficiently through the network and hence at lower costs, and also access times are reduced.

As the general trend in data applications is to generate increasingly bursty data streams, this makes for inefficient use of a circuit switched connection. Moreover, fixed networks have seen an enormous growth in data traffic, not at least because of the rise of Internet access demand, such that mobile networks will spread as technology and customer expectations evolve. The current GSM switch network is based on narrow band ISDN (Integrated Services Digital Network) circuits, so that the reason for rate limitations moves from the access network to the core network.

The new General Packet Radio Services (GPRS) network offers operators the ability to charge by the packet, and support data transfer across a high speed network at up to eight times slot radio interface capacity. GPRS introduces two new nodes into the GMS network, a Serving GPRS Support Node (SGSN) and a Gateway GPRS Support Node (GGSN). The SGSN keeps track of the location of the mobile terminal within its service area and sends and receives packets to/from the mobile terminal, passing them on to the RNC (Radio Network Controller) or to the GGSN. The GGSN receives the packets from an external network, passing them on to the SGSN, or receives the packets from the SGSN, passing them on to the external network.

The UMTS (Universal Mobile Telecommunications System) delivers advanced information directly to people and provide them with access to new and innovative services. It offers mobile personalized communications to the mass market regardless of location, network or terminal used.

In the general packet domain architecture and transmission mechanism according to 3GPP ($3^{rd}$ Generation Partnership Project) Release '99, as defined in the 3GPP specification TS 23 060, a telecommunications network providing mobile cellular services, such as a Public Land Mobile Network (PLMN), has access points, reference points and interfaces used for mobile access and origination or reception of messages. In addition, network interworking is required whenever a packet switched PLMN and any other network, such as a network based on the Internet Protocol (IP), are involved in the execution of a service request.

The term application layer is used to designate an IP subsystem, for example an IP Multimedia Subsystem, where a P-CSCF (Proxy Call State Control Function) and PCFs (Policy Control Functions) are located. The IP based mobile network architecture includes an application layer and a transport layer. The transport layer protocols and mechanisms are usually optimized for the specific type of access whereas the application layer is normally generic, this is independent of the type of access. In setting up a session in the application layer, the underlying transport layer has to set up transport bearers over the radio interface and in the transport network.

Among the network and interworking control functions necessary in such network architectures are authentication and authorization functions performing the identification and authentification of a service requester and the validation of the service request type to ensure that the service requester is authorized to use the particular network services.

A particular need in this context is the need for bearer authorization, as quality of service required for an application needs special authorization for better than "best-effort" service. IP multimedia is an example of such an application.

In 3GPP, related policy control is going to be specified for IP multimedia bearer authorization in such a way that a Packet Data Protocol (PDP) context is authorized against an ongoing multimedia session. Meanwhile, an interface between GGSN and PCF has been approved for that purpose.

In order to map a PDP context to an IP multimedia session, it has been proposed to use an Authorization Token (AUTN) as a binding information. Currently, this AUTN is intended to be a Session Initiation Protocol (SIP) parameter to be specified within an authorization scheme extension to SIP by the Internet Engineering Task Force (IETF).

In 3GPP, it is currently considered to co-locate the PCF in the Proxy Call State Control Function (P-CSCF), as is the case in the 3GPP UMTS Release 5 specifications. However, if in future releases of this specification the PCF is implemented as a separate entity, correct PCF determination may be problematic when multiple PCFs exist in an external network.

In order to address this problem, it has further been proposed to allocate the PCF address as part of the AUTN sent to a User Equipment (UE). Sending the PCF address to a UE may, however, represent a security risk, especially in cases in which the SIP application resides in a Terminal Equipment (TE) such as for example a laptop. In particular, a misbehaving UE may then block the PCF by sending authorization requests again and again to it.

SUMMARY OF THE INVENTION

The present invention provides a method and a system for bearer authorization which provides improved security for service access authorization.

Accordingly, bearer authorization in a wireless communication network comprising an application layer and a transport layer is performed by: a) creating an authorization binding information in a control function of the application layer, for example in a Policy Control Function out of a plurality of Policy Control Functions or in an application server/proxy out of a plurality of application servers/proxies, for example a PCSCF, provided in the wireless communication network, b) allocating a control function identifier representative of the actual address of the control function in the wireless communication network and incorporating the identifier into the authorization binding information, c) transmitting the so created authorization binding information to a terminal device, for example user equipment, having access to the wireless communication network, and d) carrying out the bearer authorization for the terminal device through the transport layer of the wireless communication network by deriving the actual address of the control function from which the authorization binding information has originated in the wireless communication network based on the control function identifier included in the authorization binding information.

Preferably, the identifier takes a numerical integer value selected from a predetermined range of values.

The authorization binding information may be dispatched from the terminal device to a node in the transport layer. The node may be a Serving GPRS Support Node, wherein the authorization binding information is further passed from the Serving GPRS Support Node to a Gateway GPRS Support Node in the transport layer. The node may derive the actual control function address in the wireless communication network from the control function identifier incorporated in the authorization binding information. Furthermore, the node may request authorization (au_req) from the control function having the derived actual address.

Further preferably, the authorization binding information is an authorization token the creation of the which is initiated by transmitting authorization information from an application server/proxy in the application layer of the wireless communication network to one of a plurality of Policy Control Functions in the wireless communication network.

In an advantageous constitution, the created authorization token is sent back to the application server/proxy, forwarded by the application server/proxy to the terminal device, passed by the terminal device to the transport layer of the wireless communication network, for example to a Serving GPRS Support Node (SGSN) within the transport layer, and passed from the Serving GPRS Support Node to a Gateway GPRS Support Node (GGSN) within the transport layer.

Thereby, the transport layer of the wireless communication network, for example Gateway GPRS Support Node, derives the actual control function address in the wireless communication network from the control function identifier included in the Authorization Token and to request authorization from the control function having the derived actual address.

Particularly preferred and advantageous, the address derivation is carried out by the Gateway GPRS Support Node using an access point specific list of Policy Control Function identifiers and corresponding addresses.

The system for bearer authorization in a wireless communication network according to the present invention advantageously includes the same constitutional elements and, thus, provides the same effects and benefits.

BRIEF DESCRIPTION OF THE DRAWINGS

In the following, the present invention is described in greater detail in accordance with preferred embodiments thereof and with reference to the accompanying drawings, in which.

DESCRIPTION OF THE PREFERRED EMBODIMENTS

Figure 1:
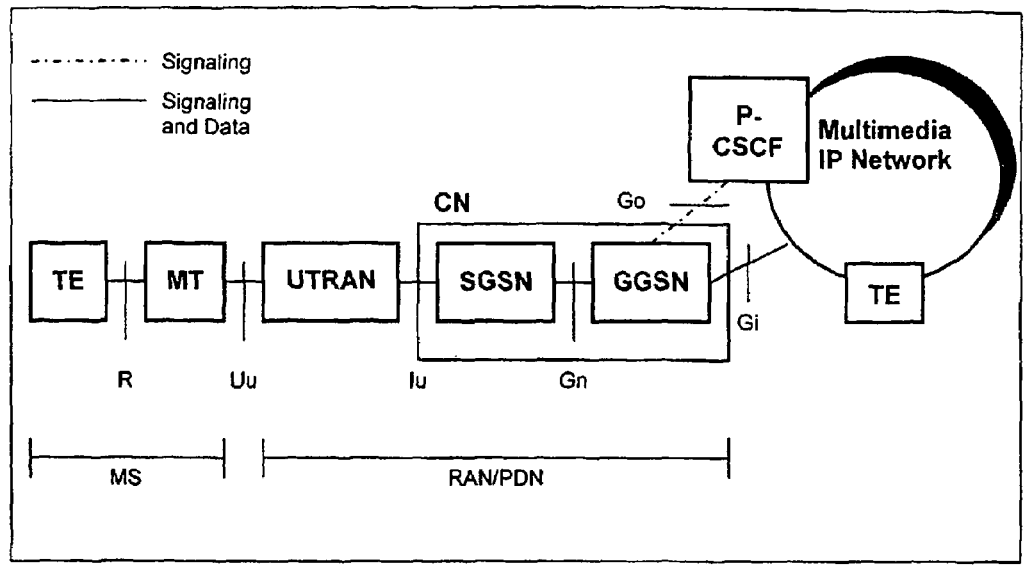
FIG. 1 schematically shows a partial block diagram of a general packet domain architecture into which the present invention can be implemented.

FIG. 1 schematically shows a partial block diagram of a general packet switched domain architecture of a Public Land Mobile Network (PLMN), including for example a UMTS based radio access system in which multiple independent broadband wireless access networks are introduced as alternative or additional radio access technologies for providing access for User Equipments (UEs) of multiple radio technologies to UMTS based core networks.

In the preferred embodiment, the transport layer is comprised of a GPRS system and the bearers for IMS session are provided by a PDP (Packet Data Protocol) context. Thus, the binding information (AUTH) is binding the transport layer bearer and the IMS session.

Network interworking is required whenever a packet switched domain PLMN and any other network, such as a network based on the Internet Protocol (IP), are involved in the execution of a service request. Such interworking is established via a PLMN to fixed network reference point Gi and an inter PLMN interface Gp interface connecting two independent PLMNs, respectively.

A common packet switched domain core network (CN) provides packet-switched (PS) services and is designed to support several quality of service levels to allow efficient transfer of non-real time traffic, such as intermittent and bursty data transfers or occasional transmissions of large data volumes, and real-time traffic such as voice or video.

A Serving GPRS Support Node (SGSN) forms the point of attachment of an individual Mobile Station (MS), consisting basically of a Terminal Equipment (TE) and a Mobile Terminal (MT), keeps track of the location thereof and performs security functions and access control. The SGSN is connected to the UMTS Terrestrial Radio Access Network (UTRAN) through an Iu interface and to a Gateway GPRS Support Node (GGSN) via an IP-based intra PLMN backbone network (Gn interface). The SGSN establishes, at PDP context activation, a PDP context to be used for routing purposes with the GGSN and the UTRAN, that is the Radio Network Controller (RNC) in the UTRAN that a subscriber will be using. The GGSN then provides interworking with external packet switched networks. The GGSN may be connected to plural SGSNs via the intra PLMN or inter PLMN backbone networks.

As mentioned above, in order to access PS services, that is to send and receive PS data, the MS must have the SGSN activate the appropriate PDP context in order to make itself known to the GGSN before interworking with external data networks can be started. The applicable PDP context related operations are also defined in the 3GPP specification TS 23 060. During interworking, user data is then transferred transparently between the MS and the external data network, that is the GGSN or the MS, by equipping data packets with PS specific protocol information and transferring them by means of encapsulation and tunneling.

Accordingly, initial authorization negotiations preparing for interworking are carried out between the GGSN and the P-CSCF thereto.

A preferred embodiment of the present invention is now described with reference to FIG. 2.

Figure 2:
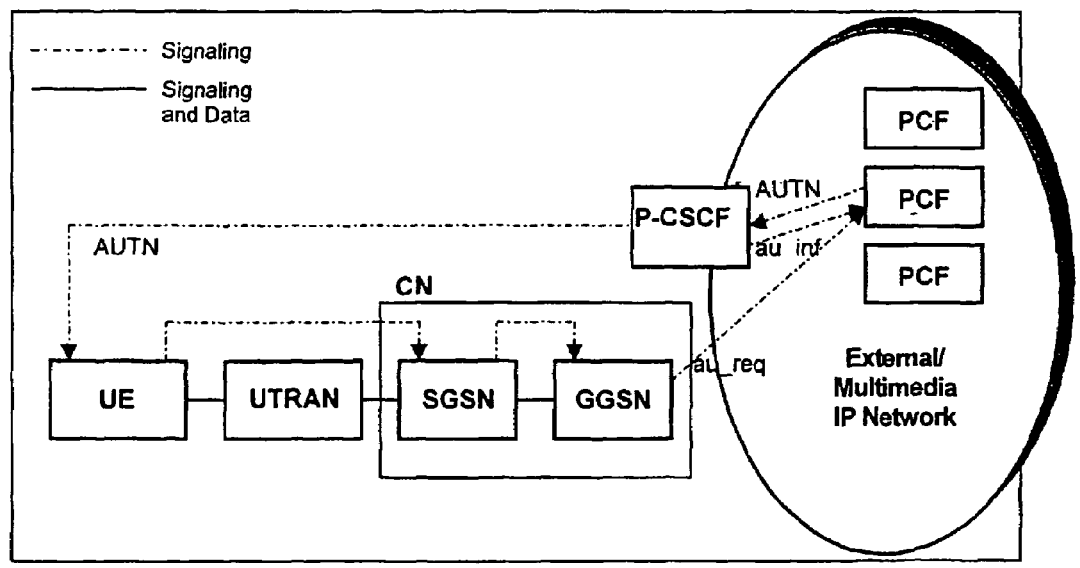
FIG. 2 illustrates in simplified manner the principle of an IP multimedia bearer authorization using an authorization token according to an embodiment of the present invention

FIG. 2 schematically shows the arrangement of the general packet switched domain architecture of FIG. 1 to which a Policy Control Function (PCF) is added, or co-located, in the P-CSCF. Signaling flow directions are indicated by corresponding arrows within broken lines.

According to FIG. 2, a plurality of PCFs are provided in at least one external network and arranged to communicate with the P-CSCF and the GGSN in the packet switched core network. In addition, signaling communications are established between the P-CSCF and the UE, between the UE and the SGSN, and between the SGSN and the GGSN.

In operation with existing multiple PCFs in an external network, the P-CSCF sends authorization information (au_inf) to one of those PCFs. In response thereto, an Authorization Token (AUTN) is created in the application layer by the addressed PCF to which the authorization request has been sent based on the authorization information forwarded by the P-CSCF, and is sent back to the P-CSCF to be dispatched toward the UE as authorization information.

Now, if as in the conventional arrangement the PCF address is allocated as part of the AUTN and, thus, included therein, sending the AUTN to the UE involves sending also the PCF address to the UE, resulting in the inherent security risk mentioned above.

According to the preferred embodiment, a PCF identifier is allocated for each PCF in an external network. The PCF identifier is a numerical integer value such as 1, 2, 3 etc. When the PCF then creates an AUTN, the PCF allocates this PCF identifier as part of the AUTN instead of the PCF address and sends the AUTN to the FCSCF, which in turn forwards it to the UE.

Advantageously, using the PCF identifier instead of the complete PCF address (or IP address) also reduces the size of the token and, thus, provides improved operational efficiency by reducing the transmission load or allows for the incorporation of further information into a token of the same size.

As the information given to the UE only includes the PCF identifier value, the UE is not able to determine the current PCF address from the received AUTN, thus eliminating the security risk inherently involved in sending the PCF address to the UE.

The restoration of the correct PCF address is performed as follows. After having received the AUTN, the UE dispatches it via a transport channel of the transport layer used for data transport to the SGSN when establishing the bearer or bearers for an IF multimedia session. The SGSN then forwards the AUTN to the GGSN communicating with the external network.

According to the present invention, the GGSN comprises an access point specific list of valid PCF identifiers and corresponding PCF addresses. Upon reception of the AUTN including the PCF identifier, the GGSN is capable of deriving the correct PCF address from the PCF identifier and, thus, sending an authorization request (au_req) to the correct PCF, that is the one that had issued the AUTN earlier.

It should be appreciated that the invention does not necessarily require the use of SIP, but is applicable to any signaling protocol of an application layer, used to set up application sessions over external (IP) networks wherein it is possible to carry respective message contents in the signaling message.

It is also noted that the present invention is not restricted to the preferred embodiment described above, but can also be implemented in call-processing network elements and any network where an authorization binding information provides a mechanism for binding a bearer to an application session in order to set up an authorized connection. The preferred embodiment may thus vary within the scope of the attached claims.

The invention claimed is:

1. A method, comprising:
    creating an authorization binding information in a control function of an application layer of a wireless communication network;
    allocating a control function identifier representative of the actual address of the control function in the wireless communication network and incorporating the identifier into the authorization binding information;
    transmitting a created authorization binding information to a terminal device having access to the wireless communication network; and
    carrying out the bearer authorization for the terminal device through a transport layer of the wireless communication network by deriving the actual address of the control function from which the authorization binding information has originated in the wireless communication network based on the control function identifier included in the authorization binding information.

2. A system, comprising:
    means for creating an authorization binding information in a control function provided in an application layer of a wireless communication network;
    means for allocating a control function identifier representative of the actual address of the control function in the wireless communication network and for incorporating the identifier into the authorization binding information;
    means for transmitting a created authorization binding information to a terminal device having access to the wireless communication network; and
    means for carrying out the bearer authorization for the terminal device through a transport layer of the wireless communication network by deriving the actual address of the control function from which the authorization binding information has originated in the wireless communication network based on the control function identifier included in the authorization binding information.

3. A system according to claim 2, wherein:
    the identifier is a numerical integer value selected from a predetermined range of values.

4. A system according to claim 2, wherein:
    the authorization binding information comprises an authorization token the creation of which is initiated by a proxy call state control function in a core network transmitting authorization information to one of a plurality of policy control functions in the wireless communication network.

5. A system according to claim 4, wherein:
    the policy control function sends the created authorization token back to the proxy call state control function, the proxy call state control function forwards the token to the terminal device, the terminal device passes the token to a serving general packet radio service support node within the core network, and the serving general packet radio service support node passes the token to a gateway general packet radio service support node within the core network.

6. A system according to claim 5, wherein:
    the gateway general packet radio service support node derives the actual policy control function address in the wireless communication network from the policy control function identifier included in the authorization token and requests authorization from the policy control function having the derived actual address.

7. A system according to claim 6, wherein:
    the gateway general packet radio service support node carrying out the address derivation using an access point specific list of policy control function identifiers and corresponding addresses.

8. A system, comprising:
    device configured to create an authorization binding information in a control function provided in an application layer of a wireless communication network;
    device configured to allocate a control function identifier representative of the actual address of the control function in the wireless communication network and for incorporating the identifier into the authorization binding information;
    device configured to transmit a created authorization binding information to a terminal device having access to the wireless communication network; and device configured to carry out the bearer authorization for the terminal device through a transport layer of the wireless communication network by deriving the actual address of the control function from which the authorization binding information has originated in the wireless communication network based on the control function identifier included in the authorization binding information.

9. The system according to claim 8, wherein:
the identifier is a numerical integer value selected from a predetermined range of values.

10. The system according to claim 8, wherein:
the authorization binding information comprises an authorization token the creation of which is initiated by a proxy call state control function in a core network transmitting authorization information to one of a plurality of policy control functions in the wireless communication network.

11. The system according to claim 8, wherein:
the policy control function is configured to send the created authorization token back to the proxy call state control function, the proxy call state control function forwards the token to the terminal device, the terminal device passes the token to a serving general packet radio service support node within the core network, and the serving general packet radio service support node passes the token to a gateway general packet radio service support node within the core network.

12. The system according to claim 8, wherein:
the gateway general packet radio service support node is configured to derive the actual policy control function address in the wireless communication network form the policy control function identifier included in the authorization token and requests authorization from the policy control function having the derived actual address.

13. The system according to claim 12, wherein:
the gateway general packet radio service support node is configured to carry out the address derivation using an access point specific list of policy control function identifiers and corresponding addresses.

14. An apparatus, comprising:
means for receiving from a wireless communication network an authorization binding information with a control function identifier representative of an actual address of a control function of an application layer of said wireless communication network; and
means for dispatching said authorization binding information with said control function identifier through a transport layer to said wireless communication network during bearer establishment,
wherein said authorization binding information is created in said control function and said identifier is incorporated into said authorization binding information.

15. An apparatus, comprising:
means for carrying out a bearer authorization for a terminal device through a transport layer of a wireless communication network; and
means for deriving an actual address of a control function of an application layer of said wireless communication network, from which an authorization binding information has originated in said wireless communication network based on a control function identifier included in a received authorization binding information,
wherein said authorization binding information is created in said control function and said identifier is incorporated into said authorization binding information.

16. An apparatus, comprising:
means for creating an authorization binding information in a control function of an application layer of a wireless communication network;
means for allocating a control function identifier representative of an actual address of said control function in said wireless communication network and for incorporating said identifier into said authorization binding information; and
means for transmitting a created authorization binding information to a terminal device having access to said wireless communication network.

17. An apparatus, comprising:
a receiver configured to receive from a wireless communication network an authorization binding information with a control function identifier representative of an actual address of a control function of an application layer of said wireless communication network; and
a dispatcher configured to dispatch said authorization binding information with said control function identifier through a transport layer to said wireless communication network during a bearer establishment,
wherein said authorization binding information is created in said control function and said identifier is incorporated into said authorization binding information.

18. An apparatus according to claim 17, wherein the control function identifier is configured to take a numerical integer value selected from a predetermined range of values.

19. An apparatus according to claim 17, wherein the authorization binding information comprises an authorization token, the creation of which is initiated by transmitting authorization information from a proxy call state control function in the wireless communication network to one of a plurality of policy control functions in the wireless communication network.

20. An apparatus according to claim 19, wherein the authorization token is sent to the proxy call state control function and forwarded by the proxy call state control function to a terminal device.

21. An apparatus according to claim 17, wherein the authorization binding information is received from a terminal device by a node in the transport layer.

22. An apparatus according to claim 21, wherein the node is a serving general packet radio service node, and the authorization binding information is further passed from the serving general packet radio service node to a gateway general packet radio service support node in the transport layer.

23. An apparatus according to claim 21, wherein the node is configured to derive the actual control function address in the wireless communication network from the control function identifier incorporated in the authorization binding information.

24. An apparatus according to claim 23, wherein the node is configured to request authorization from the control function comprising the derived actual address.

25. An apparatus according to claim 23, wherein the node is configured to carry out the address derivation using an access point specific list of control function identifiers and corresponding addresses.

26. An apparatus, comprising:
a bearer authorizer configured to carry out a bearer authorization for a terminal device through a transport layer of a wireless communication network by deriving an actual address of a control function of an application layer of said wireless communication network, from which an authorization binding information has originated in said wireless communication network based an a control function identifier included in a received authorization binding information, wherein said authorization binding information is created in said control function and said identifier is incorporated into said authorization binding information.

27. An apparatus, comprising:

a creator configured to create an authorization binding information in a control function of an application layer of a wireless communication network;

an allocator configured to allocate a control function identifier representative of an actual address of said control function in said wireless communication network and to incorporate said identifier into said authorization binding information; and a transmitter configured to transmit a created authorization binding information to a terminal device having access to said wireless communication network.

28. A computer program product embodied on a computer readable medium, said computer program product is configured to perform a process comprising:

receiving from a wireless communication network an authorization binding information with a control function identifier representative of an actual address of a control function of an application layer of said wireless communication network; and dispatching said authorization binding information with said control function identifier through a transport layer to said wireless communication network during bearer establishment, wherein said authorization binding information is created in said control function and said identifier is incorporated into said authorization binding information.

29. A computer program product embodied on a computer readable medium, said computer program product being configured to perform a process comprising:

carrying out a bearer authorization for a terminal device through a transport layer of a wireless communication network by deriving an actual address of a control function of an application layer of said wireless communication network, from which an authorization binding information has originated in said wireless communication network based an a control function identifier included in a received authorization binding information, wherein said authorization binding information is created in said control function and said identifier is incorporated into said authorization binding information.

30. A computer program product embodied on a computer readable medium, said computer program product being configured to perform a process comprising:

creating an authorization binding information in a control function of an application layer of a wireless communication network;

allocating a control function identifier representative of an actual address of a control function in said wireless communication network and incorporating said identifier into said authorization binding information; and transmitting a created authorization binding information to a terminal device having access to said wireless communication network.

31. A method, comprising:

creating an authorization binding information in a control function of an application layer of a wireless communication network;

allocating a control function identifier representative of an actual address of the control function in wireless communication network and incorporating the identifier into the authorization binding information; and transmitting a created authorization binding information to a terminal device having access to the wireless communication network.

32. A method according to claim 31, wherein:

the identifier takes a numerical integer value selected from a predetermined range of values.

33. A method according to claim 31, wherein:

the authorization binding information comprises an authorization token, the creation of which is initiated by transmitting authorization information from a proxy call state control function in the wireless communication network to one of a plurality of policy control functions in the wireless communication network.

34. A method according to claim 33, wherein:

the created authorization token is sent to the proxy call state control function and forwarded by the proxy call state control function to the terminal device.

35. A method according to claim 31, wherein:

the authorization binding information is received from the terminal device by a node in the transport layer.

36. A method according to claim 35, wherein:

the node is a serving general packet radio service support node, and the authorization binding information is further passed from the serving general packet radio service support node to a gateway general packet radio service support node in the transport layer.

37. A method according to claim 35, wherein:

the node derives the actual control function address in the wireless communication network from the control function identifier incorporated in the authorization binding information.

38. A method according to claim 37, wherein:

the node requests authorization from the control function having the derived actual address.

39. A method according to claim 37, wherein:

the address derivation is carried out by the node using an access point specific list of control function identifiers and corresponding addresses.

40. A method according to claim 39, wherein:

gateway general packet radio service support node derives the actual policy control function address in the wireless communication network from the policy control function identifier included in the authorization token and requests authorization from the policy control function having the derived actual address.

41. A method according to claim 40, wherein:

the address derivation is carried out by the gateway general packet radio service support node using an access point specific list of policy control function identifiers and corresponding addresses.

42. A method, comprising:

carrying out a bearer authorization for a terminal device through a transport layer of a wireless communication network by deriving an actual address of a control function of an application layer of said wireless communication network, from which an authorization binding information has originated in the wireless communication network based on a control function identifier included in a received authorization binding information, wherein said authorization binding information is created in said control function and said identifier is incorporated into said authorization binding information.

43. A method, comprising:

receiving from a wireless communication network an authorization binding information with a control function identifier representative of an actual address of a control function of an application layer of said wireless communication network; and dispatching said authorization binding information with said control function identifier through a transport layer to said wireless communication network during a bearer establishment, wherein said authorization binding information is created in said control function and said identifier is incorporated into said authorization binding information.

* * * * *